B. EITNER.
BALL HOLDING CAGE FOR BALL BEARINGS.
APPLICATION FILED FEB. 7, 1910.

980,932.

Patented Jan. 10, 1911.

Witnesses:

Inventor
Berthold Eitner
By his Attorneys
Rogers & Kennedy

THE NORRIS PETERS CO., WASHINGTON, D. C.

UNITED STATES PATENT OFFICE.

BERTHOLD EITNER, OF REINICKENDORF WEST, NEAR BERLIN, GERMANY.

BALL-HOLDING CAGE FOR BALL-BEARINGS.

980,932.

Specification of Letters Patent.

Patented Jan. 10, 1911.

Application filed February 7, 1910. Serial No. 542,370.

*To all whom it may concern:*

Be it known that I, BERTHOLD EITNER, a subject of the German Emperor, residing at Reinickendorf West, near Berlin, Germany, have invented certain new and useful Improvements in Ball-Holding Cages for Ball-Bearings, of which the following is a specification, reference being had therein to the accompanying drawing.

My invention relates to ball-holding cages for ball-bearings, and more particularly to that class thereof wherein the cage is formed integrally, and hence does not require the fitting or securing of separate pieces thereto.

Generally speaking, it comprises a supporting ring provided with standards between the balls, whereby the spaces between adjacent standards constitute the sockets for the balls, and wherein the standards are formed with projecting pieces or tines, which when bent transversely of the ring hold the balls within the sockets. More specifically, the spaces between the standards are hollowed out or formed concavely, so as to correspond to the contour of the balls, the shaping of the sockets in this manner preventing the lateral escape of the balls therefrom; and the projecting pieces or tines are preferably two in number on each standard, and located at opposite radial points thereon, in such manner that they may be bent toward each other so as to form a bridge or curved portion across the sides of the balls, after the latter have been located in the sockets.

In the accompanying drawings, I have shown my invention as applied in a preferred form of embodiment, but obviously many changes and variations may be made therein without departing from its spirit, and generally speaking, I do not limit myself to any specific form or arrangement of parts, except in so far as such limitations are specified in the claim.

Figure 1:
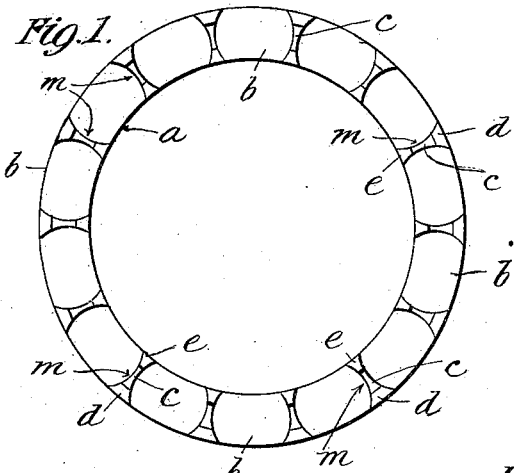
Figure 2:
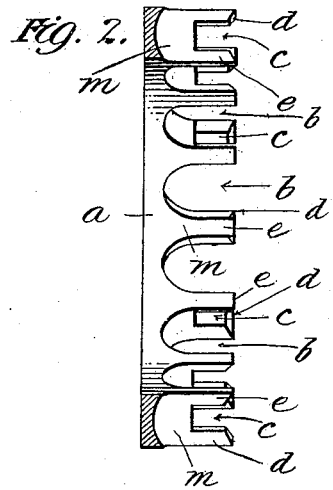
Figure 3:
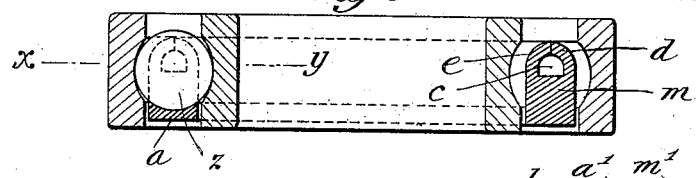

Referring to the drawings: Figure 1 is a plan view of a cage constructed in accordance with my invention; Fig. 2 is a transverse section thereof; Fig. 3 is a transverse section of a ball-bearing showing the cage in assembled position; and Figs. 4, 5 and 6 are views similar to Figs. 1, 2 and 3, but showing the application of my invention in a modified form.

Referring first to Figs. 1, 2 and 3, the cage comprises the supporting ring $a$, provided with the standards $m$, which standards are hollowed out or concaved so as to form sockets $b$ for the balls. It will also be noted that each of the standards $m$ is formed with two projecting pieces or tines $d$, $e$, which tines are located at radially opposite points with reference to each other, and preferably separated by a kerf $c$, which extends circumferentially around the entire ring $a$. The balls are placed within the sockets $b$, after which the tines $e$, $d$, are bent toward each other, and in such manner that they form a bridge or arch across the sides of the balls, and thus serve to hold them in the sockets. Fig. 3 shows an assembled bearing provided with this form of cage and comprising the outer ring $x$, inner ring $y$, and balls $z$, located therebetween. This figure also shows clearly the bridge or arch formed by the tines $d$, $e$, when bent toward each other in the manner previously described, it being understood that this bridge or arch extends sufficiently across the sides of the balls in the sockets to insure their retention therein.

Figure 4:
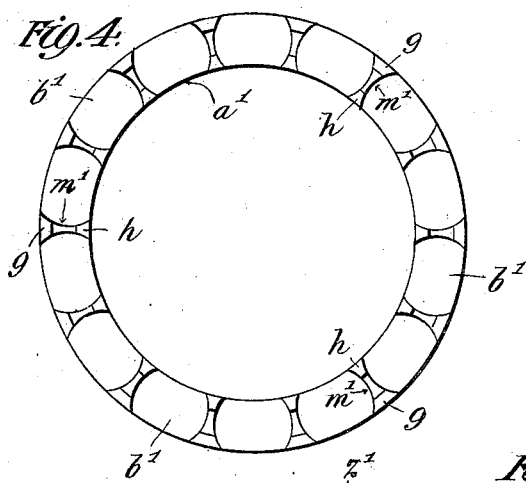
Figure 5:
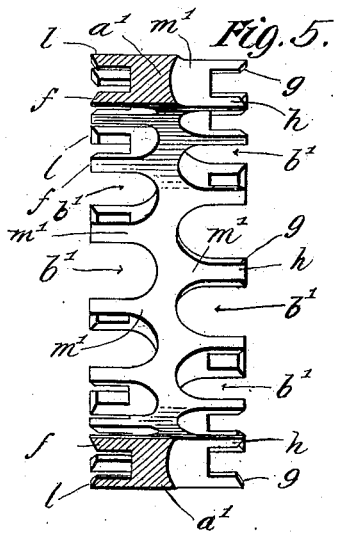
Figure 6:
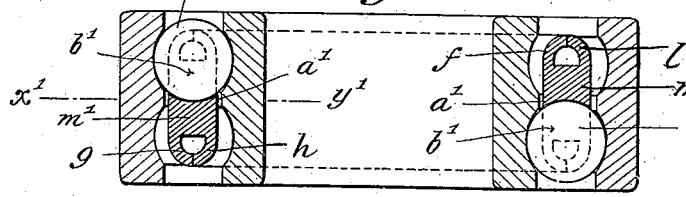

In Figs. 4, 5 and 6 I have shown my invention as applied to a form of cage designed for a two-series ball-bearing, and wherein the balls of the two series are staggered relatively one to the other. In this form it will be seen that the sockets $b^1$, $b^1$, are located on both sides of the ring $a^1$, and are interspaced or staggered, in the manner shown in Fig. 5. The sockets are separated by the standards $m^1$, and each standard is formed with two projecting pieces or tines $f$, $l$, or $g$, $h$, respectively. Fig. 6 shows the bearing assembled, and consisting of the outer ring $x^1$, inner ring $y^1$, and two series of balls $z^1$, $z^2$, located therebetween. It will be seen that the respective series of tines $f$, $l$, and $g$, $h$, are bent together so as to form the arch or bridge and to retain the balls within the sockets in the same manner as previously described.

Obviously many other changes and variations will suggest themselves to those skilled in the art without departure from the spirit of my invention.

Having thus described my invention, its construction and mode of operation, what I claim and desire to secure by Letters Patent of the United States is as follows:

1. A ball holding cage for ball bearings, comprising a supporting ring provided with standards, each extending across the ring in a radial direction and separating the balls, the spaces between adjacent standards constituting sockets for the balls, and the standards being formed with projecting tines, which, when bent radially of the ring hold the balls within the sockets.

2. A ball holding cage for ball bearings, comprising a supporting ring provided with standards between the balls, the spaces between the standards being shaped to correspond to the contour of the balls so as to form sockets therefor, and the standards being formed with projecting tines which when bent radially of the ring hold the balls within the sockets.

In testimony whereof I have affixed my signature in presence of two witnesses.

BERTHOLD EITNER.

Witnesses:
   HENRY HASPER,
   WOLDEMAR HAUPT.